United States Patent
Pagé-Caccia et al.

(10) Patent No.: US 11,151,734 B2
(45) Date of Patent: Oct. 19, 2021

(54) METHOD AND SYSTEM FOR GENERATING SYNTHETIC POINT CLOUD DATA USING A GENERATIVE MODEL

(71) Applicants: Lucas Pagé-Caccia, Montréal (CA); Joelle Pineau, Montréal (CA); Elmira Amirloo Abolfathi, North York (CA)

(72) Inventors: Lucas Pagé-Caccia, Montréal (CA); Joelle Pineau, Montréal (CA); Elmira Amirloo Abolfathi, North York (CA)

(73) Assignees: HUAWEI TECHNOLOGIES CO., LTD., Shenzhen (CN); THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 92 days.

(21) Appl. No.: 16/568,885

(22) Filed: Sep. 12, 2019

(65) Prior Publication Data

US 2020/0090357 A1    Mar. 19, 2020

Related U.S. Application Data

(60) Provisional application No. 62/731,690, filed on Sep. 14, 2018.

(51) Int. Cl.
*G06T 7/00*     (2017.01)
*G06T 7/521*    (2017.01)
(Continued)

(52) U.S. Cl.
CPC ........... *G06T 7/521* (2017.01); *G06N 3/0454* (2013.01); *G06N 3/08* (2013.01); *G06N 20/10* (2019.01);
(Continued)

(58) Field of Classification Search
CPC .......... G06T 7/521; G06T 2207/20081; G06T 2207/20084; G06N 20/20; G06N 20/10; G06N 3/0454; G06N 3/08
See application file for complete search history.

(56) References Cited

U.S. PATENT DOCUMENTS

| 9,349,105 B2* | 5/2016 | Beymer ................. G06N 20/00 |
| 2017/0213093 A1* | 7/2017 | Li .............................. G06N 3/04 |

(Continued)

FOREIGN PATENT DOCUMENTS

| CN | 106951847 A | 7/2017 |
| CN | 107025642 A | 8/2017 |

OTHER PUBLICATIONS

Farbian Groh, et al. Flex-convolution deep learning beyond grid-worlds arXiv:1803.07289v1 (Year: 2018).*

(Continued)

*Primary Examiner* — Ping Y Hsieh
*Assistant Examiner* — Xiao Liu

(57) ABSTRACT

Methods and systems for generating synthetic point cloud data are described. Projected 2D data grid is generated by projecting a 3D point cloud into a 2D grid, with rotation equivariance. A generative model is learned using the projected 2D data grid, wherein the generative model is implemented using flex-convolution and transpose flex convolution operations, for example in a generative adversarial network. The learned generative model is used to generate synthetic point clouds.

17 Claims, 9 Drawing Sheets

(51) Int. Cl.
    *G06N 3/08*     (2006.01)
    *G06N 3/04*     (2006.01)
    *G06N 20/20*     (2019.01)
    *G06N 20/10*     (2019.01)

(52) U.S. Cl.
    CPC .... *G06N 20/20* (2019.01); *G06T 2207/20081* (2013.01); *G06T 2207/20084* (2013.01)

(56) References Cited

U.S. PATENT DOCUMENTS

| | | |
|---|---|---|
| 2018/0260513 A1 | 9/2018 | Dweik |
| 2018/0260636 A1 | 9/2018 | Zou et al. |

OTHER PUBLICATIONS

Groh, Fabian et al. Flex-Convolution Deep Learning Beyond Grid-Worlds arXiv: 1803.07289v1 Mar. 20, 2018, total 17 pages.

Goodfellow, I., Pouget-Abadie, J., Mirza, M., Xu, B., Warde-Farley, D., Ozair, S., & Bengio, Y. (2014). Generative adversarial nets. In Advances in neural information processing systems (pp. 2672-2680) 2014.

Zhu, J. Y., Park, T., Isola, P., & Efros, A. A. (2017). Unpaired image-to-image translation using cycle-consistent adversarial networks. arXiv preprint 2017.

Qi, C. R., Su, H., Mo, K., & Guibas, L. J. (2017). Pointnet: Deep learning on point sets for 3d classification and segmentation. Proc. Computer Vision and Pattern Recognition 2017.

Qi, C. R., Yi, L., Su, H., & Guibas, L. J. (2017). Pointnet++: Deep hierarchical feature learning on point sets in a metric space. In Advances in Neural Information Processing Systems(pp. 5099-5108) 2017.

Li, Y., Bu, R., Sun, M., & Chen, B. (2018). PointCNN. arXiv preprint arXiv:1801.07791 2018.

Simonovsky, M., & Komodakis, N. (Jul. 2017). Dynamic edgeconditioned filters in convolutional neural networks on graphs. In Proc. CVPR 2017.

Groh, F., Wieschollek, P., & Lensch, H. (2018). Flex-Convolution (Deep Learning Beyond Grid-Worlds). arXiv preprint arXiv:1803.07289 2018.

* cited by examiner

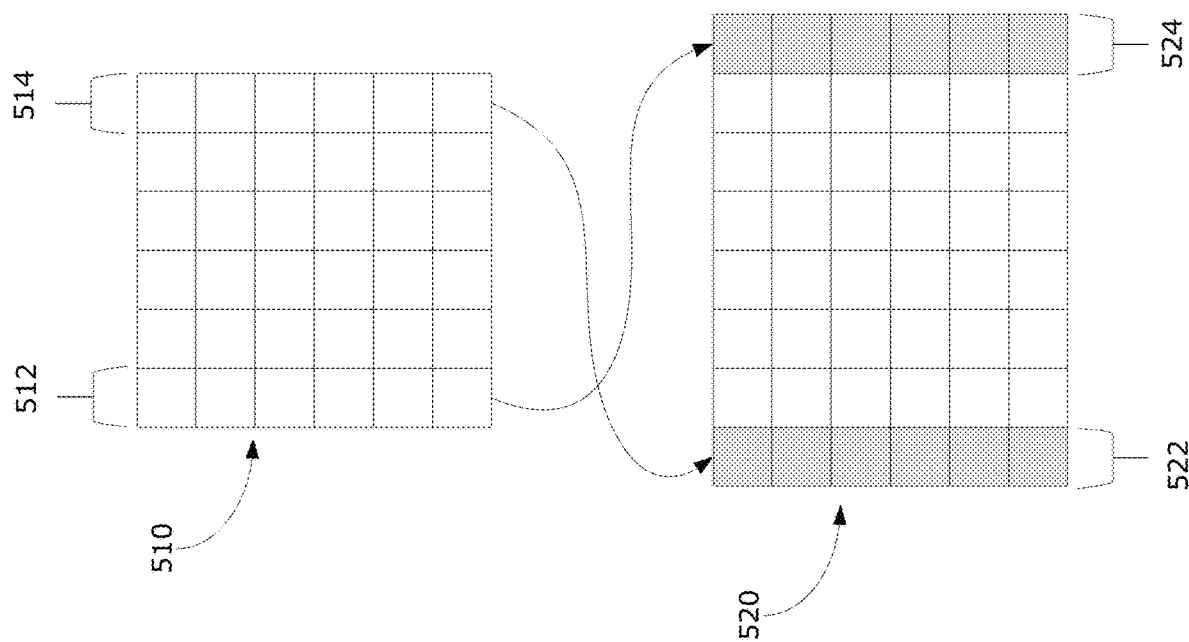

METHOD AND SYSTEM FOR GENERATING SYNTHETIC POINT CLOUD DATA USING A GENERATIVE MODEL

CROSS-REFERENCE TO RELATED APPLICATIONS

The present disclosure claims priority to U.S. provisional patent application No. 62/731,690, entitled "METHOD AND SYSTEM FOR GENERATING SYNTHETIC POINT CLOUD DATA USING FLEX CONVOLUTION", filed Sep. 14, 2018, the entirety of which is hereby incorporated by reference.

FIELD

The present disclosure relates to systems and methods for learning a generative model for generating synthetic point cloud data and using a learned generative model for generating synthetic point cloud data from data selected from a distribution.

BACKGROUND

Understanding the environment has a key role in many autonomous tasks. The success of an autonomous device (e.g., robot or vehicle) in performing an autonomous task depends on robust input sensory data and also the algorithms used for processing the sensory data. In many cases the sensory data is noisy or missing some sensory data. In order to be able to handle this situation, an autonomous device needs to have an "understanding" of that sensory data. Humans have this ability. For example, if some pixels are missing from some frames in a video, humans can easily "predict/imagine" the missing data (e.g., generate those missing samples in their brain based on temporal and spatial information they have about those pixels) and still have the same perception of the video.

Furthermore, many autonomous tasks need to be tested and even trained in a simulator environment, because training and testing autonomous devices in a real world environment may be difficult, for example may be expensive and/or unsafe (e.g., in the case of autonomous driving). However, many conventional simulators fail to provide realistic sensory data for the autonomous device. As a result, the autonomous devices trained and tested in a simulator may not perform as well in the real world environment. Hence, there is a desire to build simulators capable of generating more realistic data.

To address the above issues, an effective method for generating synthetic data is required. In recent years, researchers have succeeded in generating image and video data using generative models, for example as described by Goodfellow et al. (*Advances in neural information processing systems* pp. 2672-2680, 2014) and Zhu et al, (arXiv preprint, 2017). However, in most cases, autonomous devices need a three-dimensional (3D) understanding of the world to perform well and this relies on accurate 3D sensory data (e.g., in the form of point clouds). Generating point cloud is currently a challenging task.

Generative models are a class of machine learning methods with the goal of generating samples from the same distribution as the training data. There are different types of generative models, such as variational auto-encoders (VAEs) and generative adversarial networks (GANs). Many of the generative models which use convolutional neural networks (CNNs) in their architecture need an operation which can be interpreted as the inverse of the convolution (e.g., in the decoder in VAEs or in the generators in a GAN setting). For regular convolutions this operation is transposed convolutions. Many deep learning based methods capture local features in ways that are not inversible.

Accordingly, there is a need for systems and methods for generating synthetic data that addresses at least some of the above issues.

SUMMARY

The present disclosure provides methods and systems for generating synthetic data, in the form of point clouds. The disclosed methods and systems learn a generative model from point cloud during a training phase and generate synthetic point clouds from the learned generative model during an inference phase. The disclosed methods and systems, in some examples, may make use of a Deep Neural Network (DNN) architecture. The present disclosure also describes methods and systems for ordering and projecting data points from a point cloud into a grid-based data structure, which may help to improve efficiency for learning of the generative model during the training phase.

In accordance with an aspect of the present disclosure, there is provided a method that includes: obtaining a first batch of point clouds representing a three-dimensional (3D) environment; generating a projected two-dimensional (2D) data grid for each of the point clouds of the first batch of point clouds by projecting each point cloud of the first batch of point clouds into a projected 2D data grid with rotation equivariance; and during a training phase, learning a generative model which generates one or more batches of synthetic point clouds, the generative model being learned by providing the generative model with the projected 2D data grid for each of the point clouds of the first batch, wherein the generative model comprises flex-convolution operations and transpose flex-convolution.

In accordance with the preceding aspect, the method further include: generating, using the learned generative model, one or more batches of synthetic point clouds from data sampled from a distribution.

In accordance with any preceding aspect, generating the projected 2D data grid further includes: padding the projected 2D data grid by wrapping elements of the grid from one edge of the projected 2D data grid to an opposite edge; and during the training phase, learning the generative model using the projected 2D data grid after the padding.

In accordance with any preceding aspect, each point cloud of the first batch of point clouds is projected to the projected 2D data grid using the equation:

$$(x, y, z) \to \left(\sqrt{x^2 + y^2}, \tan^{-1}\frac{y}{x}, z\right)$$

where x, y and z represent 3D coordinates of data points in the point cloud.

In accordance with the preceding aspect, the projected 2D data grid is padded by adding an added leftmost column that contains elements from an original rightmost column of the projected 2D data grid, and adding an added rightmost column that includes elements from an original leftmost column of the projected 2D data grid, wherein the number of padded columns is determined by a size of convolution kernels.

In accordance with any preceding aspect, each row in the projected 2D data grid corresponds to a respective closed loop in the point cloud.

In accordance with any preceding aspect, the method further includes: supplementing any missing data points from a point cloud in the first batch using the one or more batches of synthetic point clouds.

In accordance with the preceding aspect, the method further includes: combining the generative model with a sequential model which generates synthetic temporal data for predicting any missing data points from a point cloud in the first batch.

In accordance with the preceding aspect, the learned generative model is a recurrent neural network (RNN).

In accordance with any preceding aspect, the method further includes: generating, using the learned generative model, one or more batches of synthetic point clouds from data sampled from a distribution, conditioned on an action of an autonomous device.

In accordance with an aspect of the present disclosure, there is provided method that includes: obtaining a first batch of point clouds representing a three-dimensional (3D) environment; generating a projected two-dimensional (2D) data grid for each of the point clouds of the first batch of point clouds by projecting each point cloud of the first batch of point clouds into a projected 2D data grid with rotation equivariance; and during a training phase, learning a generative model which generates one or more batches of synthetic point clouds, the generative model being learned by providing the generative model with the first batch of point clouds, wherein the projected 2D data grids are used to identify nearest neighbors for performing flex-convolution operations and transpose flex-convolution operations during the learning.

In accordance with the preceding aspect, the method further includes generating, using the learned generative model, one or more batches of synthetic point clouds from data sampled from a distribution.

In accordance with the preceding aspect, generating the projected 2D data grid further includes: padding the projected 2D data grid by wrapping elements of the grid from one edge of the projected 2D data grid to an opposite edge; and during the training phase, learning the generative model using the projected 2D data grid after the padding.

In accordance with any preceding aspect, the method further includes: combining the generative model with a sequential model which captures temporal data for predicting any missing data points from a point cloud in the first batch of point clouds.

In accordance with any preceding aspect, the learned generative model is a recurrent neural network (RNN).

In accordance with another aspect of the present disclosure, there is provided a processing unit comprising: a processor; a memory storing computer-executable instructions which, when executed by the processor cause the processing unit to: obtain a first batch of point clouds representing a three-dimensional (3D) environment; generate a projected two-dimensional (2D) data grid for each of the point clouds of the first batch of point clouds by projecting each point cloud of the first batch of point clouds into a projected 2D data grid with rotation equivariance; and during a training phase, learn a generative model which generates one or more batches of synthetic point clouds, the generative model being learned by providing the generative model with the projected 2D data grid for each of the point clouds of the first batch, wherein the generative model comprises flex-convolution operations and transpose flex-convolution operations.

BRIEF DESCRIPTION OF THE DRAWINGS

Reference will now be made, by way of example, to the accompanying drawings which show example embodiments of the present application, and in which:

FIG. 5 is a diagram illustrating padding of a projected 2D grid, in accordance with examples described herein;

Similar reference numerals may have been used in different figures to denote similar components.

DESCRIPTION OF EXAMPLE EMBODIMENTS

Some examples of the present disclosure are described in the context of autonomous vehicles. However, the methods and systems disclosed herein may also be suitable for implementation outside of autonomous devices, for example in the context of non-vehicular devices and/or semi-autonomous devices. For example, any system or device that requires training and/or testing using point clouds and/or that may benefit from the ability to synthesize point clouds during operation may benefit from the present disclosure. Further, examples of the present disclosure may be used for learning a generative model that generates a synthetic point cloud in other contexts.

Although examples described herein may refer to a car as the autonomous vehicle, the teachings of the present disclosure may be relevant to other forms of autonomous or semi-autonomous devices including, for example, trams, subways, trucks, buses, surface and submersible watercraft and ships, aircraft, drones (also called unmanned aerial vehicles (UAVs)), warehouse equipment, construction equipment or farm equipment, and may include vehicles that do not carry passengers as well as vehicles that do carry passengers. The methods and systems disclosed herein may also be relevant to non-vehicular devices, for example autonomous vacuum cleaners and lawn mowers.

Figure 1:
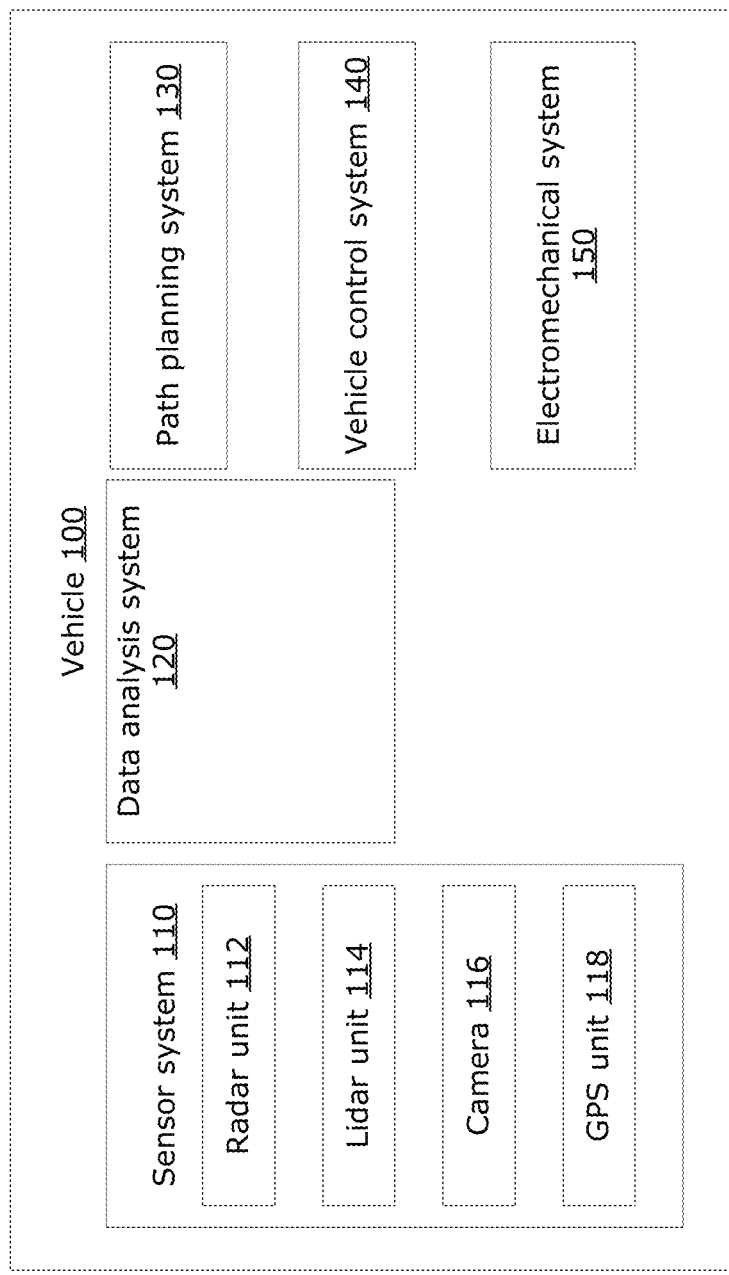
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car; however the present disclosure may be implemented in other vehicular or non-vehicular machines, as discussed above.

The vehicle 100 includes a sensor system 110, a data analysis system 120, a path planning system 130, a vehicle control system 140 and an electromechanical system 150, for example. Other systems and components may be included in the vehicle 100 as appropriate. Various systems and components of the vehicle may communicate with each other, for example through wired or wireless communication. For example, the sensor system 110 may communicate with the data analysis system 120, path planning system 130 and the vehicle control system 140; the data analysis system 120 may communicate with the path planning system 130 and the vehicle control system 140; the path planning system 130 may communicate with the vehicle control system 140; and the vehicle control system 140 may communicate with the mechanical system 150.

The sensor system 110 includes various sensing units for collecting information about the internal and/or external environment of the vehicle 100. In the example embodiment shown, the sensor system 110 includes a radar unit 112, a LIDAR unit 114, a camera 116 and a global positioning system (GPS) unit 118. The sensor system 110 may include other sensing units, such as a temperature sensor, precipitation sensor or microphone, among other possibilities.

In example embodiments, LIDAR unit 114 may include one or more LIDAR sensors and may capture data in a wide view (e.g., 360° view) about the vehicle 100. The LIDAR data (e.g., the raw sensor data acquired by the LIDAR sensor(s)) may incorporate three-dimensional (3D) information about the environment, and may be processed to form a set of data points in 3D space. In the present disclosure, the term 3D point cloud or simply point cloud will be used to refer to a set of data points having a 3D structure in space. Each data point in the 3D point cloud represents the 3D coordinates (e.g., x, y and z values) of a sensed object in 3D space. The set of data points in a 3D point cloud may be irregularly spaced, depending on the sensed environment. In some examples, in addition to 3D coordinates, each data point in the point cloud may also contain other information, such as intensity of reflected light or time of detection.

Using the various sensing units 112, 114, 116, 118, the sensor system 110 may collect information about the local environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). The sensor system 110 may also collect information about the position and orientation of the vehicle 100 relative to a frame of reference (e.g., using the GPS unit 118).

The sensor system 110 communicates with the data analysis system 120 to enable detection and identification of objects in environment of the vehicle 100, for example to detect and identify a stationary obstacle, or a pedestrian or another vehicle. The data analysis system 120 may be implemented using software, which may include any number of independent or interconnected modules or functions, for example including machine learning algorithms and image processing functions. The data analysis system 120 may be implemented using one or more dedicated image processing units, or may be implemented using one or more general processing units of the vehicle 100. The data analysis system 120 may repeatedly (e.g., in regular intervals) receive raw sensor data from the sensor system 110, process the raw sensor data, and perform image analysis in real-time or near real-time. The output of the data analysis system 120 may include, for example identification of objects, including object class, object location and object boundary, in 2D and/or 3D space.

Data acquired by the sensor system 110 and processed by the data analysis system 120 may be provided to the path planning system 130. The vehicle control system 140 serves to control operation of the vehicle 100 based on target objectives set by the path planning system 130. The vehicle control system 140 may be used to provide full, partial or assistive control of the vehicle 100. The electromechanical system 150 receives control signals from the vehicle control system 140 to operate the mechanical and/or electromechanical components of the vehicle 100 such as an engine, transmission, steering system and braking system.

The sensor system 110, data analysis system 120, path planning system 130 and the vehicle control system 140 may be individually or in combination be realized, at least in part, in one or more processing units of the vehicle 100.

Prior to operation in a real-world environment, the vehicle 100 may need to be trained and/or tested for the desired operation. During training and/or testing, the data analysis system 120, path planning system 130 and/or vehicle control system 140 may be trained and/or tested outside of the context of the vehicle 100. For example, one or more modules of the data analysis system 120 may be machine learning-based modules that implement models that are learned using machine learning algorithms such as deep learning. The machine learning-based modules may be implemented using a neural network such as a convolution neural network (CNN), which may be trained and/or tested. Training and/or testing the neural network may be performed using real-world data (e.g., obtained by operating the vehicle 100 in a real-world environment) and/or using synthetic data. Synthetic data is typically generated to simulate real-world data that would be received via the sensor system 110.

During real-world operation, the vehicle 100 may also make use of synthetic data. For example, one or more sensors of the sensor system 110 may be blocked or otherwise impeded from obtaining sensed data at some point in real-world operation (e.g., due to temporary occlusion of the LIDAR unit 114). The vehicle 100 may generate synthetic data to estimate at least some of the missing data. For example, the sensor system 110 may implement a learned generative model for generating such synthetic data when there is missing data.

Figure 2:
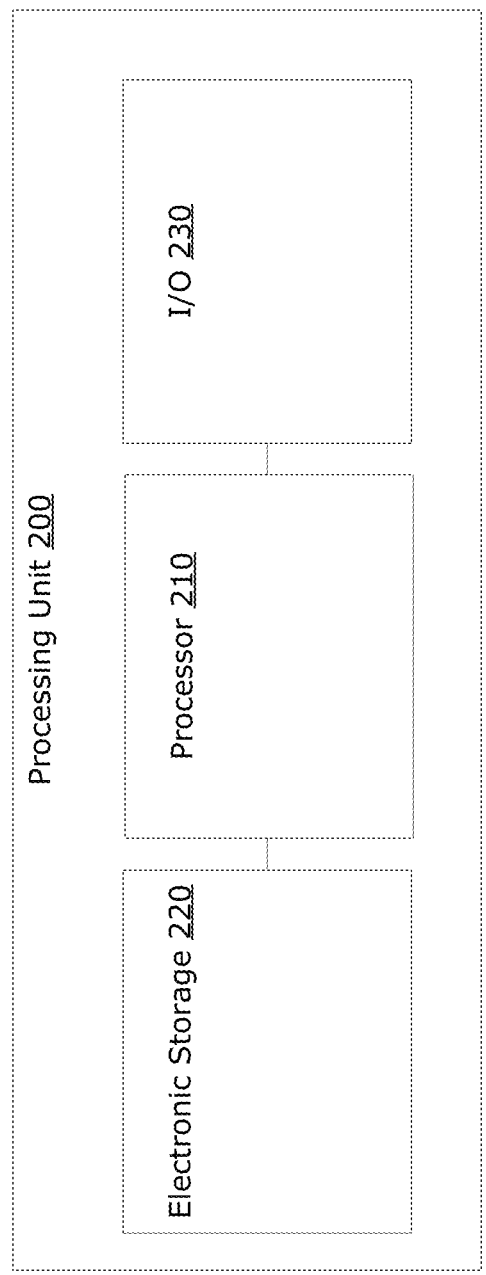
FIG. 2 is block diagram illustrating some components of a processing system used to implement a method for learning a generative model which generates a synthetic point cloud.

By way of example, FIG. 2 shows illustrates an example of a processing unit 200 that may be used to learn a generative model from batches of real point clouds during a training phase, and used to implement the learned generative model to generate synthetic data from data sampled from a distribution described in further detail below. In some embodiments, the processing unit 200 may be implemented in the vehicle 100 of FIG. 1, for example in order to implement the learned generative model for generating synthetic data during operation of the vehicle 100. The processing unit 200 may also be external of the vehicle 100, for example in order to implement the learned generated model that generates synthetic data for training and/or testing of the vehicle 100 outside of a real-world environment (e.g., within a simulation).

In this example, the processing unit 200 includes one or more physical processors 210 (e.g., a microprocessor, graphical processing unit, digital signal processor or other computational element) coupled to an electronic storage 220 and to one or more input and output interfaces or devices 230. The electronic storage 220 can include tangible memory (for example flash memory) and transient memory (for example RAM). The tangible memory(ies) may store instructions, data and/or software modules for execution by the processor(s) to carry out the examples described herein. The electronic storage 220 may include any suitable volatile and/or non-volatile storage and retrieval device(s). The electronic storage 220 may include one or more of random access memory (RAM), read only memory (ROM), hard disk, optical disc, subscriber identity module (SIM) card, memory stick, secure digital (SD) memory card, and the like.

In the example of FIG. 2, computer instructions and data are stored in electronic storage 220 of processing unit 200 that enable the processor 210 to generate synthetic data, as disclosed herein.

Synthetic data may be required to be in the form of a 3D point cloud. For example, raw data acquired by a LIDAR unit is often in the form of a point cloud and it may be desirable to generate synthetic data in a similar form.

The success of applying convolutions to two-dimensional (2D) images has led to a desire to use convolutions for processing 3D point clouds. However, unlike 2D images, 3D point clouds are typically invariant to permutation. Studies have been conducted to process point cloud data using Deep Neural Networks (DNNs). PointNet (e.g., as described by Qi et al. in *Proc. Computer Vision and Pattern Recognition (CVPR), IEEE,* 1(2), 4, 2017) is an example of a DNN that uses permutation invariant operations (maximum operation) which can effectively capture global features. However, PointNet has been found to be unsuccessful in extracting local features. Other DNNs, such as Pointnet++ (e.g., as described by Qi et al. in *Advances in Neural Information Processing Systems* pp. 5099-5108, 2017), PointnetCNN (e.g., as described by Li et al. in arXiv preprint arXiv: 1801.07791, 2018) and other CNNs such as ModelNet (e.g., as described by Simonovsky et al, in *Proc. CVPR,* 2017, July) introduced variants of point cloud convolutions that can extract both local and global features.

For generative models, it is desirable for the operator to be differentiable with respect to a data point's location in the 3D point cloud (e.g., as defined by x, y, z coordinates). This may help with better gradient flow, which may lead to more efficient and/or effective learning of the gradient models during the training phase. Gradient flow is generally important for all machine learning algorithms.

A generative adversarial network (GAN) is a type of generative model which generates synthesized data. A GAN generative model includes a generator and a discriminator. The generator is configured to generate synthetic point clouds and the discriminator evaluates the synthetic point clouds. The objective of the generator is to generate synthetic point clouds that cannot be distinguished by the discriminator from real point clouds (e.g., point clouds generated from raw LiDAR sensor data). Typically, during a training phase, the GAN is trained using real point clouds until the synthetic point clouds generated by the generator (using a learned generative model) cannot be distinguished from a real point cloud by the discriminator. The discriminator may be implemented using a neural network such as a CNN, and the generator may be implemented using another neural network such as a deconvolutional neural network. Although the present disclosure describes examples in which a neural network is used to learn and deploy the generative model, this is not intended to be limiting and other machine-learning approaches may be used.

In the case of GANs, the gradient flow of the data is crucial, as the only way for the generator to learn is to receive gradients from the discriminator. Among proposed point cloud convolutions, flex-convolution may allow for such propagation of gradients. Flex-convolution is described by Groh et al. in *arXiv preprint arXiv:*1803.07289, 2018. Flex-convolution extends the common convolution operator on images from a 2D grid to arbitrary 3D locations via a spatial dependence through the convolution weights. Flex-convolution thus provides an approach for applying convolution to 3D point clouds, in which data points may have irregularly spaced neighbours.

When flex-convolutions are used as building blocks of the discriminator of a GAN or a DNN encoder of a variational autoencoder (VAE), inverse operators (similar to transposed convolution) can be defined in the decoder of the generator of the GAN or the decoder of the VAE. Other deep learning based methods capture local features in ways that are not inversible (e.g., grouping the neighboring points and doing convolution on each group (referred to a group operation) extracts local features but it is not clear how to inverse the grouping operation). However, when using flex-convolutions, querying all the neighboring points in a 3D space is computationally expensive. To address this issue, the present disclosure describes an approach in which 3D points in the point cloud are projected to a 2D grid-based data structure.

Figure 3:
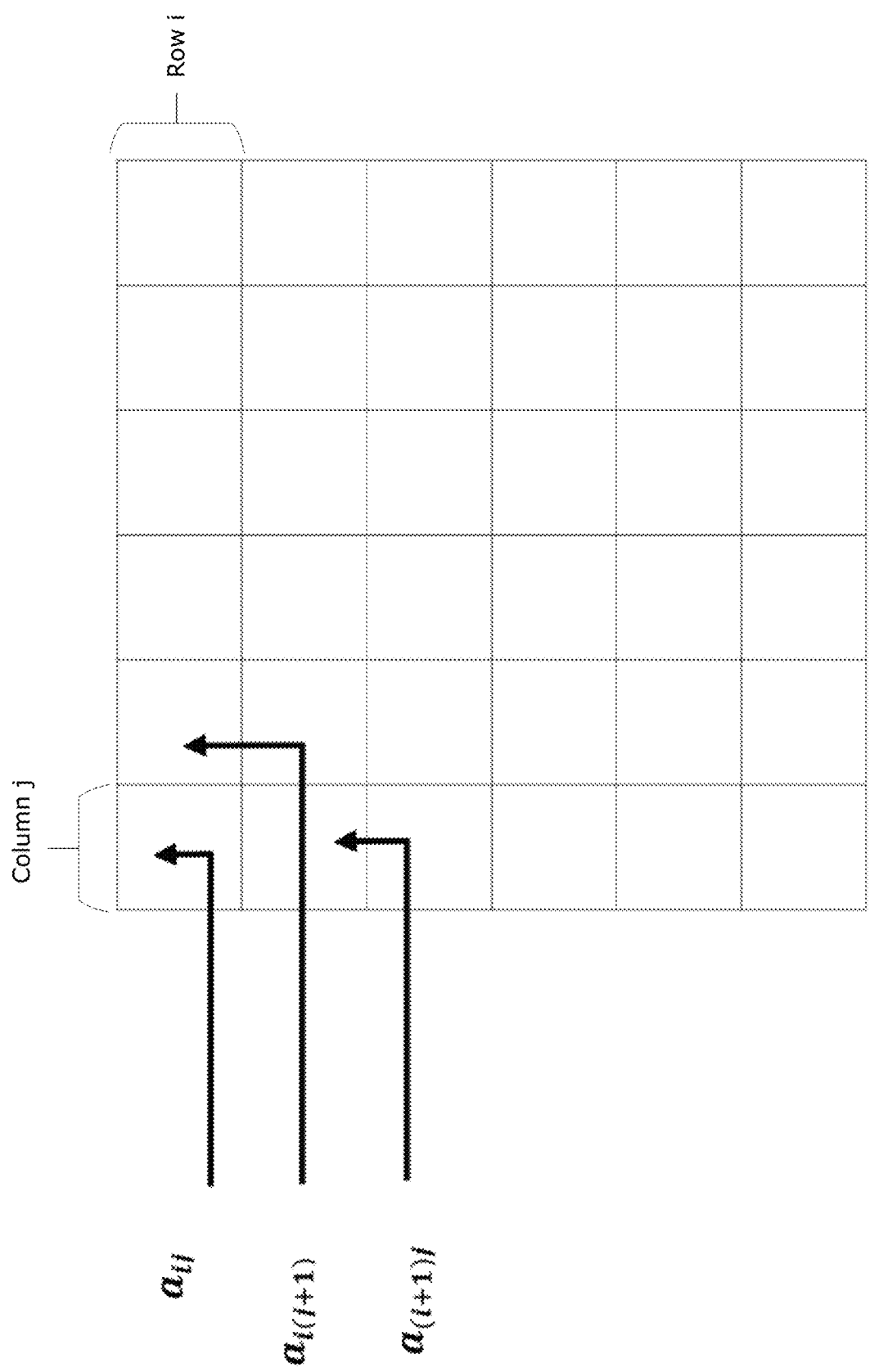
FIG. 3 is a diagram conceptually illustrating how 2D convolutions are applied to grid-based data.

To better understand the present disclosure, consider the data structure of a 2D image. A 2D image typically is encoded as a 2D grid-based data structure. 2D convolutions may be applied to a grid-based data structure, such as an image. In these structures, the order of each element is defined based on the location of each element in the grid. For example, as shown in FIG. 3, the element in row i (also referred to as the i-th row) and column j (also referred to as the j-th column) of the grid is indexed as element $a_{ij}$. The element in row i and column j+1 is similarly indexed as element $a_{i(j+1)}$, and the element in row i+1 and column j is similarly indexed as element $a_{(i+1)j}$. This order of index is used in the 2D convolution. Consider, for example, a 3×3 2D kernel containing nine elements. To perform a 2D convolution for the element at the middle of the 3×3 grid, the eight neighbouring elements as well as the center pixel may be considered, for example using a linear convolution calculation.

For data in a 3D point cloud, points are not ordered in the manner of a 2D grid, and the neighbours of any given point in the 3D point cloud cannot be easily identified. Considering all possible neighbours of a point in a given 3D point cloud may also be computationally expensive. In the present disclosure, such issues are addressed by defining a grid-based structure for points in a 3D point cloud.

For example, 3D point clouds generated by a Velodyne 64 LIDAR can be decomposed as 64 scans over 360°. In some embodiments, horizontal and vertical dimensions may be quantized (e.g., for better efficiency).

When 2D convolutions are applied to 2D data (i.e., 2D image data), the operation is translation equivariant. Similarly, defining a grid-based data structure, onto which a point cloud is projected, should also have a rotation equivariance property. To achieve this, a polar coordinate system may be used.

Figure 4:
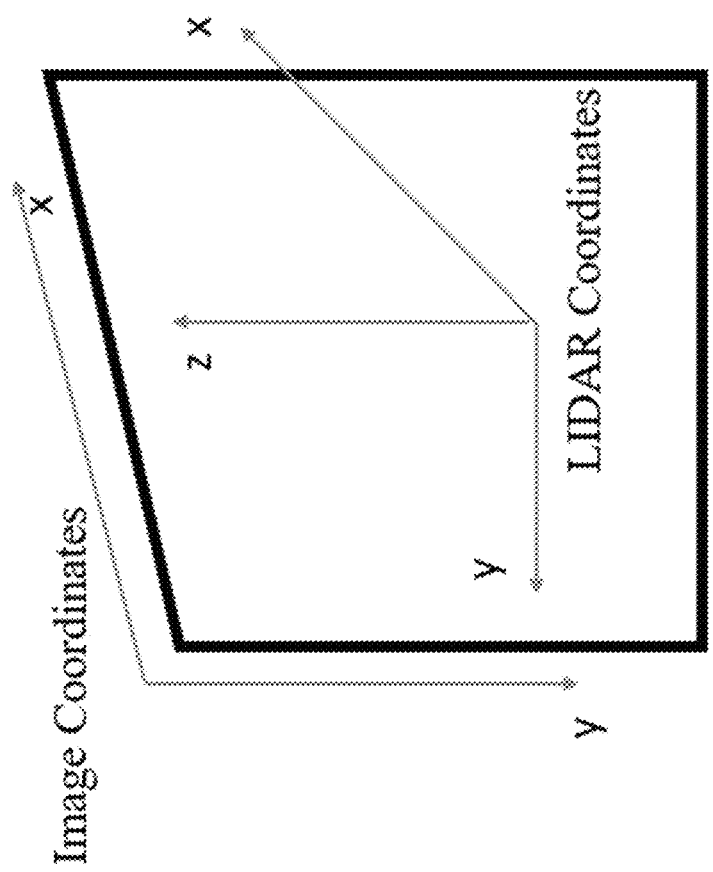
FIG. 4 is a diagram illustrating 2D image coordinates relative to 3D light detection and ranging (LIDAR) coordinates.

Consider, for example, a 2D coordinate system (e.g., for 2D image data) and a 3D coordinate system (e.g., for LIDAR data) as illustrated in FIG. 4.

A projection of the 3D point cloud to a 2D grid-based data structure may be defined as follows:

$$(x, y, z) \rightarrow \left(\sqrt{x^2 + y^2}, \tan^{-1}\frac{y}{x}, z\right)$$

Such a projection may be conceptually understood as projecting a closed loop in the point cloud to a single row in a 2D grid. When projected in this way, the first and last elements in each row are actually neighbours of each other. In order to ensure that the projected 2D data accurately reflects this, the leftmost column and the rightmost column of the 2D data grid may be padded with values from the other side (instead of zero padding, which is commonly done when dealing with 2D images). An example of this is illustrated in FIG. 5. For a projected 2D data grid 510, a padded 2D data grid 520 is generated with an added leftmost column 522, containing values from the rightmost column 514 of the original projected data grid 510, and with an added rightmost column 524, containing values from the leftmost column 512 of the projected data grid 510. The padded data grid 520 may be generated by adding the added columns 522, 524 to the projected data grid 510. Alternatively, the padded data grid 520 may be a new data structure that is created in addition to the projected data grid 510.

Figure 6A:
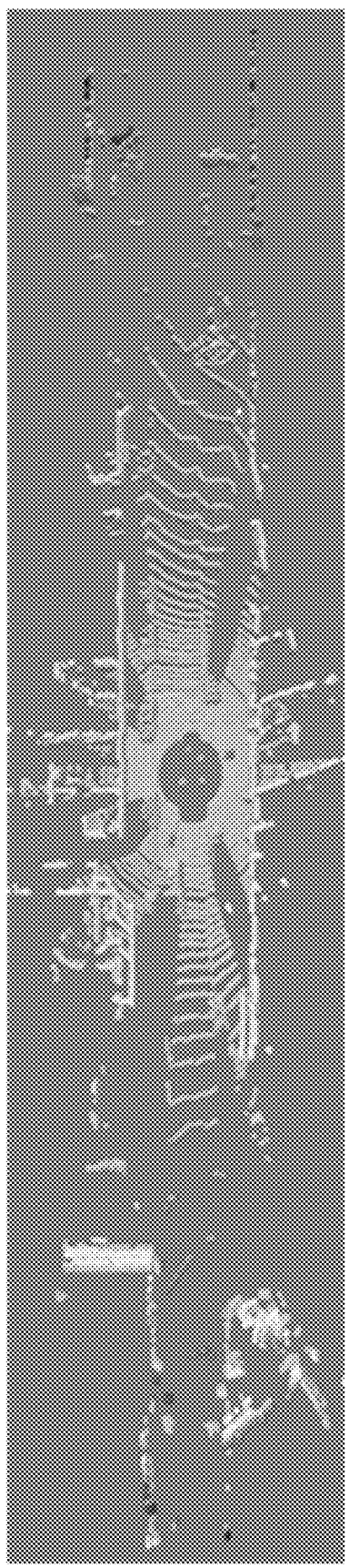
FIGS. 6A-6C are images showing an example projection of a point cloud to a 2D grid, in accordance with examples described herein.
Figure 6B:
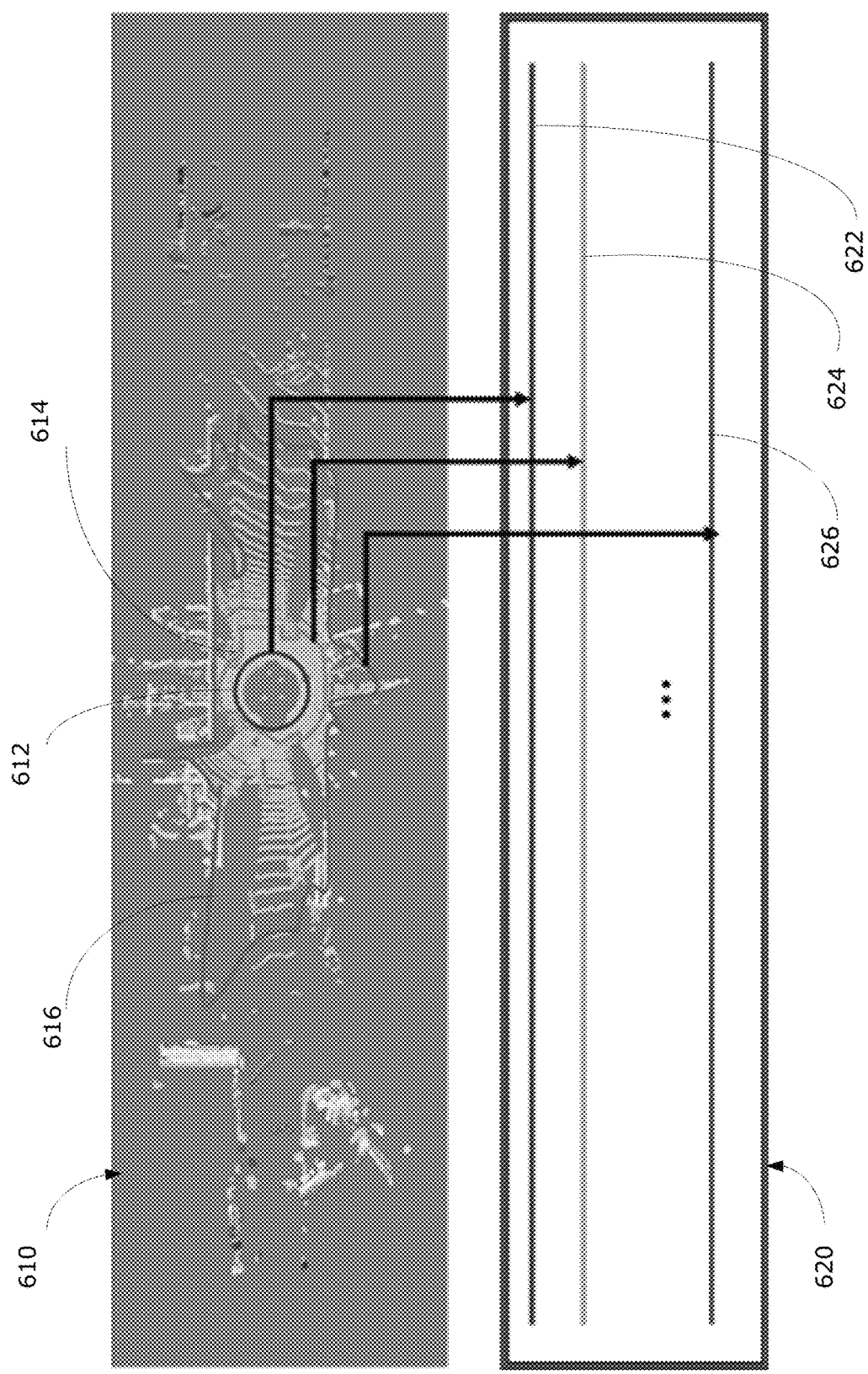
Figure 6C:
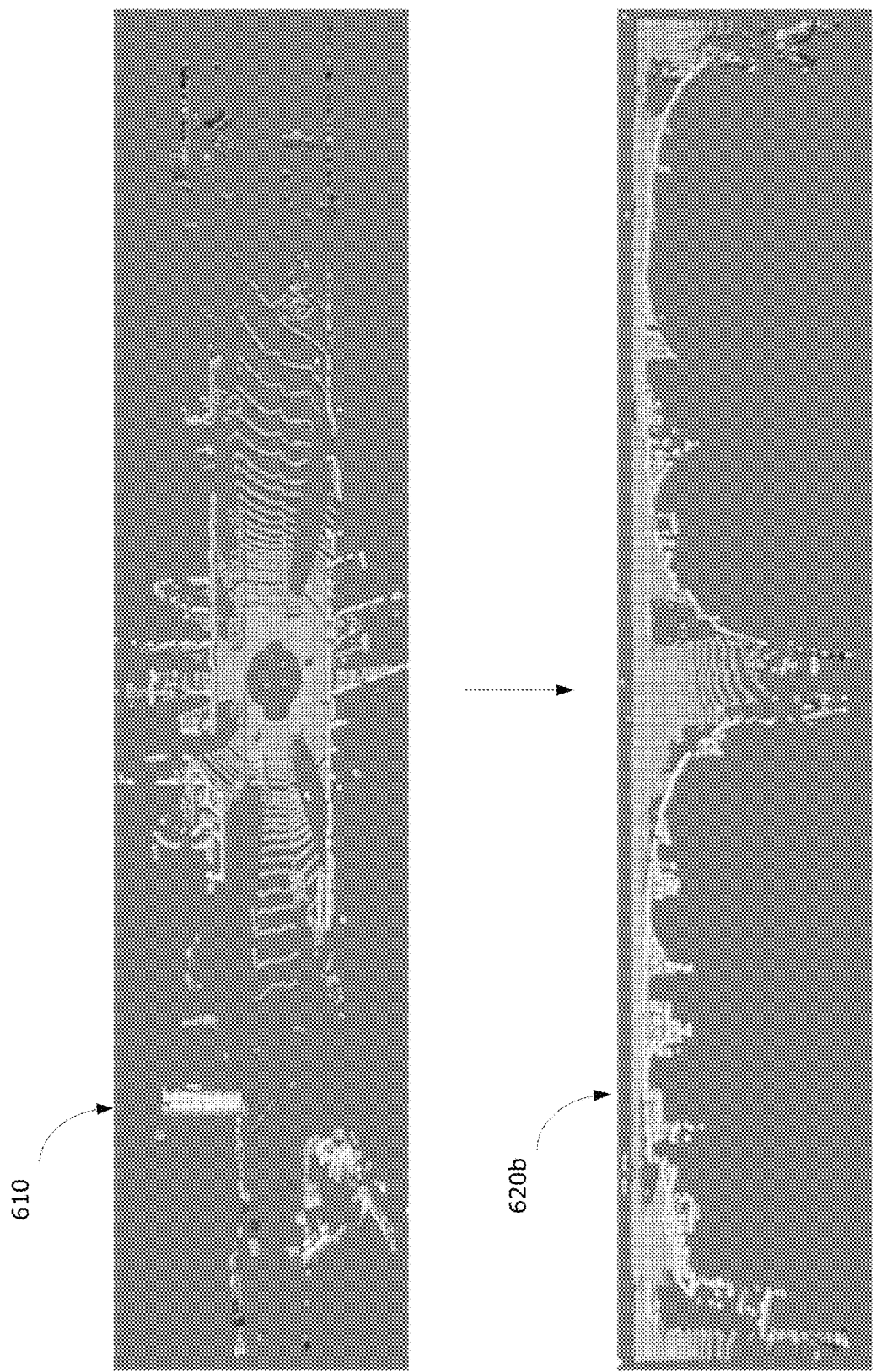

FIGS. 6A-6C illustrate an example of how a point cloud is projected to a 2D data grid, using the approach described above. FIG. 6A is a 2D representation of 3D point cloud 610. The point cloud 610 contains information in a 360° view, for example a 360° view around a LIDAR sensor. In the 2D representation shown, the sensor would be situated in the center of the image. FIG. 6B illustrate how the point cloud 610 is projected to a 2D data grid format, as described above. Three closed loops 612, 614, 616 are highlighted in the point cloud 610. It should be noted that the loops 612, 614, 616 are not necessarily circular, and may be irregularly shaped and irregularly spaced. Each closed loop 612, 614, 616 is projected to a respective row 626, 624, 626 in a 2D data grid 620. Although not explicitly shown, the 2D data grid 620 may be padded as described above. FIG. 6C shows the 2D representation of the point cloud 610, and a visual representation of the 2D data grid 620b after being projected.

It may be possible that there is some information loss when a point cloud is projected to a 2D data grid. This concern may be at least partially addressed by generating the padded data grid as described above, which helps to ensure that the neighbouring elements on the leftmost and rightmost columns reflect the data in the point cloud. Other elements that are not at the edges of the 2D data grid may be less affected by the projection. Further, the computational efficiency gained by this approach may be sufficient for any possible loss of information to be acceptable as a tradeoff.

In some examples, it may not be necessary to pad the 2D data grid as described above. For example (e.g., where the projected 2D data grid has a large number of columns) the information lost by omitting the added leftmost and added rightmost columns may be considered acceptable.

Having projected the point cloud to a 2D data grid format, the projected 2D data grid is used as input to learn the generative model, for example a GAN generative model. The generative model may thus be learned to generate a synthetic 3D point cloud.

Figure 7:
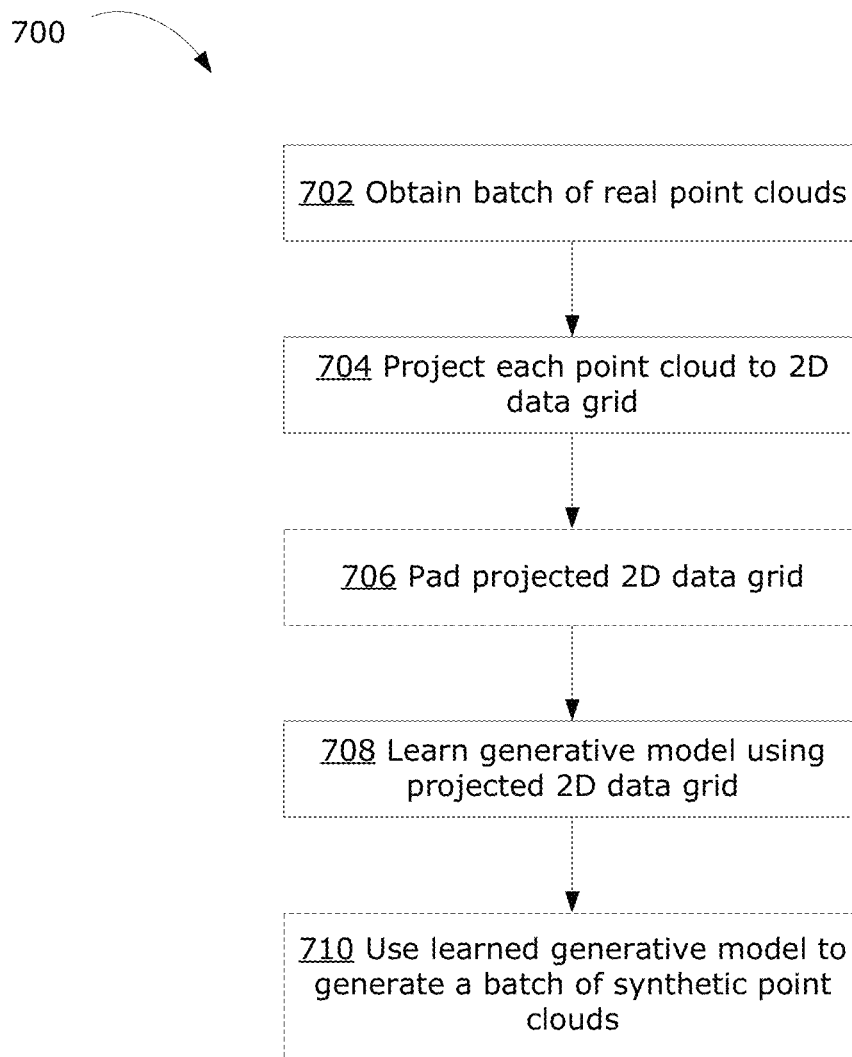
FIG. 7 is a flowchart illustrating an example method for learning a generative model which generates a synthetic point cloud.

FIG. 7 is a flowchart illustrating a method 700 for learning a generative model which generates one or more batches of synthetic point clouds from sampled data.

At 702, a first batch of real point clouds is obtained. The first batch of point clouds may be obtained directly from a LIDAR sensor, for example a LIDAR sensor of the LIDAR unit 114 of FIG. 1. The first batch of point clouds may also be obtained, for example from a database or memory that stores point clouds previously obtained from the LIDAR unit 114.

At 704, each point cloud of the first batch of point clouds is projected to generate a projected 2D data grid. The 2D data grid may have a similar format as a 2D image. The projection may be performed using the equation as described above:

$$(x, y, z) \rightarrow \left(\sqrt{x^2 + y^2}, \tan^{-1}\frac{y}{x}, z\right)$$

This operation may help to ensure the rotation equivariance needed for processing, for example, a LIDAR point cloud. Other equations may be used for performing the projection, for example any other projection may be used where rotation equivariance is achieved. For example, although the present disclosure describes a projection in which a closed loop in the point cloud is projected to a row in the 2D data grid, other approaches may project a closed loop in the point cloud to a column in the 2D data grid.

Another example approach to generate the projected 2D data grid, which achieves rotation equivariance, is now described. This example approach generates a data grid having H rows and W columns. First, the data points in a point cloud are clustered together according to elevation angle. This results in H clusters, corresponding to H LIDAR channels (each channel capturing data at a particular elevation angle). For every cluster, the data points are sorted in increasing order of azimuth angle (in some cases this sorting may not be necessary where the raw data from the LIDAR unit is already ordered). In order to have a grid with a fixed number of elements per row, 360° is divided into a fixed number of bins, resulting in W bins, each bin defining a range of azimuth angles. The data points within a cluster are placed into corresponding bins, according to azimuth angle. For every bin, the average of the data points belonging to that bin is calculated to obtain a single representative value. In this way, H×W elements are populated into the 2D data grid. In some implementations, the 2D grid may have a depth of 3, where each of the x, y and z spatial coordinates are recorded in each depth.

Optionally, at 706, the projected data grid is padded such that the elements at the edges of the projected data grid wrap to opposite edges.

In the example where the projected data grid contains rows corresponding to closed loops in the 3D point cloud, the 2D data grid may be padded by adding an added leftmost column containing elements from the rightmost column of the original projected data grid, and adding an added rightmost column containing elements from the original leftmost column of the projected data grid. The number of columns padded to the edges of the resultant 2D data grid depends on the size of the kernel convolution.

The padding may be modified in the case where loops in the 3D point cloud are projected to columns in the 2D data grid. In such an example, the projected data grid may be padded by adding an added topmost row containing elements from the original bottommost row of the projected data grid, and adding an added bottommost row containing elements from the original topmost row of the projected data grid. Other such modifications to the padding operation may be used, for different projection approaches.

The projected data grid may be padded by adding the added columns/rows directly to the projected data grid, or a new data structure may be created for the padded data grid. Padding the data grid in this way may help the generative model to understand the relationship between the points close to the edges of the data grid.

At 708, the projected data grid (with or without padding) is used to learn the generative model. The generative model may use flex-convolution operations and transpose flex-convolution operations, and may be learned using a GAN as discussed above. Learning of the generative model may involve performing 702-708 repeatedly using different batches of real-world point clouds.

The generative model may be learned by inputting the projected data grid to the generative model, so as to learn a generative model that generates a synthetic point cloud from sampled 2D data.

In another possible approach, the generative model may be learned by inputting the 3D point cloud to the generative model, so as to learn a generative model that generates a synthetic point cloud from sampled 3D data. As discussed above, flex convolutions are used in learning a generative model. In this approach, the projected 2D data grid is not used directly as input to the generative model, but assists in performing flex convolutions. The projected 2D data grid is used to identify the nearest neighboring points for each data point in the point cloud, for computing flex convolutions. For example, for a given data point in the point cloud, the corresponding data element in the 2D data grid is identified as well as the neighboring elements in the 2D data grid (e.g., the k nearest neighbors). Those neighboring elements, which have been identified in the 2D data grid, are then referenced back to the point cloud such that the neighboring data points in the point cloud are identified. Flex convolution can then be performed using those identified neighboring data points in the point cloud.

At 710, after the generative model has been appropriately learned, the generative model may optionally be used to generate a batch of synthetic 3D point clouds. For example, data sampled from a selected distribution (e.g., a normal distribution, a Gaussian distribution, or a polynomial distribution, among other possibilities and depending on the desired application) may be provided as input to the learned generative model, to be used to generate the batch of synthetic 3D point clouds.

In some examples, the step 710 may take place separately from the other steps of the method 700. For example, the generative model may be learned in one setting (e.g., in a lab setting) and the learned generative model may be used to generate a batch of synthetic point clouds in a different setting (e.g., in an autonomous vehicle). Thus, the present disclosure also describes a method of generating a batch of synthetic point clouds using a generative model that has been already learned in the manner described above.

In some examples, steps 702-708 may be repeated over time. For example, learning the generative model may include generating projected 2D data grids using a second batch of point clouds, and using the second batch of point clouds and corresponding projected 2D data grids to further learn the generative model. In some examples, steps 702-708 may be performed in parallel with 710. That is, learning of the generative model may be continued over time, and may be performed in parallel with generation of synthetic data by the generative model.

The method 700 may be used to generate a batch synthetic point clouds for training and/or testing purposes, for example to train and/or test an autonomous or semi-autonomous device.

The method 700 may be at least partially implemented in an autonomous device. For example, at least the use of the trained generative model to generate synthetic point cloud data may be implemented in an autonomous vehicle (e.g., to supplement missing sensor data).

In some examples, the method 700 may be performed together, on the same processing system. In other examples, portions of the method 700 may be performed separately, and may be performed by different systems.

The method 700 may be at least partly performed by the processing unit 200 of FIG. 2. For example, the processing unit 200 may execute instructions to perform steps 702-706 above, to generate projected 2D data grid from a point cloud. The processing unit 200 may execute instructions to perform step 708 above, to learn the generative model using the projected 2D data grid as input. The processing unit 200 may execute step 710 above, to implement the learned generative model which generates synthetic point clouds.

In examples described herein, the present disclosure enables generation of synthetic point clouds that more accurately reflects real-world point clouds (e.g., data from a LIDAR unit). The synthetic point clouds may be generated by a generative model that is learned in an unsupervised manner.

The synthetic point clouds generated in this way may be used to supplement missing point clouds and/or missing data points in point clouds (e.g., real point clouds acquired using a LIDAR unit).

In some examples, the learned generative model may be combined with a sequential model. A sequential model may be learned to generate a sequence of synthetic point clouds. This may be used to generate synthetic temporal data, for example to predict and/or supplement missing data in a real point cloud. The sequential model may be implemented using a recurrent neural network (RN N) with flex convolution operations. In such an implementation, the learned generative model may be used in cells of the RNN. In some embodiments, the RNN may be the learned generative model.

In some examples, when the learned generative model is implemented in an autonomous device (e.g., an autonomous vehicle), a batch of synthetic point clouds may be generated conditioned on (or in response to) an action of the autonomous device. Such an action may be performed in the real world or within a simulation. For example, an action by the autonomous device, such as turning left, may be fed back to the generative model to enable the generative model to generate synthetic point clouds that reflect this action.

In some examples, the present disclosure describes a method that includes generating a set of synthetic point cloud data using a generative model, the generative model being implemented using flex-convolution in a generative adversarial network. The generative model has been trained using one or more projected two-dimensional (2D) data grids, the projected 2D data grids having been generated from respective sets of three-dimensional (3D) point cloud data by projecting each set of point cloud data to the respective projected 2D data grid while maintaining rotation equivariance.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A method comprising:
obtaining a first batch of point clouds representing a three-dimensional (3D) environment;
generating a projected two-dimensional (2D) data grid for each of the point clouds of the first batch of point clouds by projecting each point cloud of the first batch of point clouds into a projected 2D data grid with rotation equivariance, and padding the projected 2D data grid by wrapping elements of the projected 2D data grid from one edge of the projected 2D data grid to an opposite edge; and
during a training phase, learning a generative model which generates one or more batches of synthetic point clouds, the generative model being learned by providing the generative model with the projected 2D data grid, which has been padded, for each of the point clouds of the first batch, wherein the generative model comprises flex-convolution operations and transpose flex-convolution operations.

2. The method of claim 1, further comprising:
generating, using the learned generative model, one or more batches of synthetic point clouds from data sampled from a distribution.

3. The method of claim 1, wherein each point cloud of the first batch of point clouds is projected to the projected 2D data grid using the equation:

$$(x, y, z) \rightarrow \left(\sqrt{x^2 + y^2}, \tan^{-1}\frac{y}{x}, z\right)$$

where x, y and z represent 3D coordinates of data points in the point cloud.

4. The method of claim 3 wherein padding the projected 2D data grid comprises adding an added leftmost column that contains elements from an original rightmost column of the projected 2D data grid, and adding an added rightmost column that includes elements from an original leftmost column of the projected 2D data grid, wherein the number of padded columns is determined by a size of convolution kernels.

5. The method of claim 3, wherein each row in the projected 2D data grid corresponds to a respective closed loop in the point cloud.

6. The method of claim 1 further comprising:
supplementing any missing data points from a point cloud in the first batch using the one or more batches of synthetic point clouds.

7. The method of claim 1 further comprising:
combining the generative model with a sequential model which generates synthetic temporal data for predicting any missing data points from a point cloud in the first batch.

8. The method of claim 7, wherein the learned generative model is a recurrent neural network (RNN).

9. The method of claim 1, further comprising:
generating, using the learned generative model, one or more batches of synthetic point clouds from data sampled from a distribution, conditioned on an action of an autonomous device.

10. A method comprising:
obtaining a first batch of point clouds representing a three-dimensional (3D) environment;
generating a projected two-dimensional (2D) data grid for each of the point clouds of the first batch of point clouds by projecting each point cloud of the first batch of point clouds into a projected 2D data grid with rotation equivariance, and padding the projected 2D data grid by wrapping elements of the grid from one edge of the projected 2D data grid to an opposite edge; and
during a training phase, learning a generative model which generates one or more batches of synthetic point clouds, the generative model being learned by providing the generative model with the first batch of point clouds, wherein the projected 2D data grids, which have been padded, are used to identify nearest neighbors for performing flex-convolution operations and transpose flex-convolution operations during the learning.

11. The method of claim 10, further comprising:
generating, using the learned generative model, one or more batches of synthetic point clouds from data sampled from a distribution.

12. The method of claim 10, further comprising:
combining the generative model with a sequential model which captures temporal data for predicting any missing data points from a point cloud in the first batch of point clouds.

13. The method of claim 12, wherein the learned generative model is a recurrent neural network (RNN).

14. A processing unit comprising:
a processor;
a memory storing computer-executable instructions which, when executed by the processor cause the processing unit to:
obtain a first batch of point clouds representing a three-dimensional (3D) environment;

generate a projected two-dimensional (2D) data grid for each of the point clouds of the first batch of point clouds by projecting each point cloud of the first batch of point clouds into a projected 2D data grid with rotation equivariance, and padding the projected 2D data grid by wrapping elements of the grid from one edge of the projected 2D data grid to an opposite edge; and during a training phase, learn a generative model which generates one or more batches of synthetic point clouds, the generative model being learned by providing the generative model with the projected 2D data grid, which has been padded, for each of the point clouds of the first batch, wherein the generative model comprises flex-convolution operations and transpose flex-convolution operations.

15. The processing unit of claim 14, wherein the instructions further cause the processing unit to:

generate, using the learned generative model, one or more batches of synthetic point clouds from data sampled from a distribution.

16. The processing unit of claim 14, wherein each point cloud of the first batch of point clouds is projected to the projected 2D data grid using the equation:

$$(x, y, z) \rightarrow \left( \sqrt{x^2 + y^2}, \tan^{-1}\frac{y}{x}, z \right)$$

where x, y and z represent 3D coordinates of data points in the point cloud.

17. The processing unit of claim 16, wherein the instructions further cause the processing unit to pad the projected 2D data grid by adding an added leftmost column that contains elements from an original rightmost column of the projected 2D data grid, and adding an added rightmost column that includes elements from an original leftmost column of the projected 2D data grid, wherein the number of padded columns is determined by a size of convolution kernels.

* * * * *